United States Patent Office 3,531,270
Patented Sept. 29, 1970

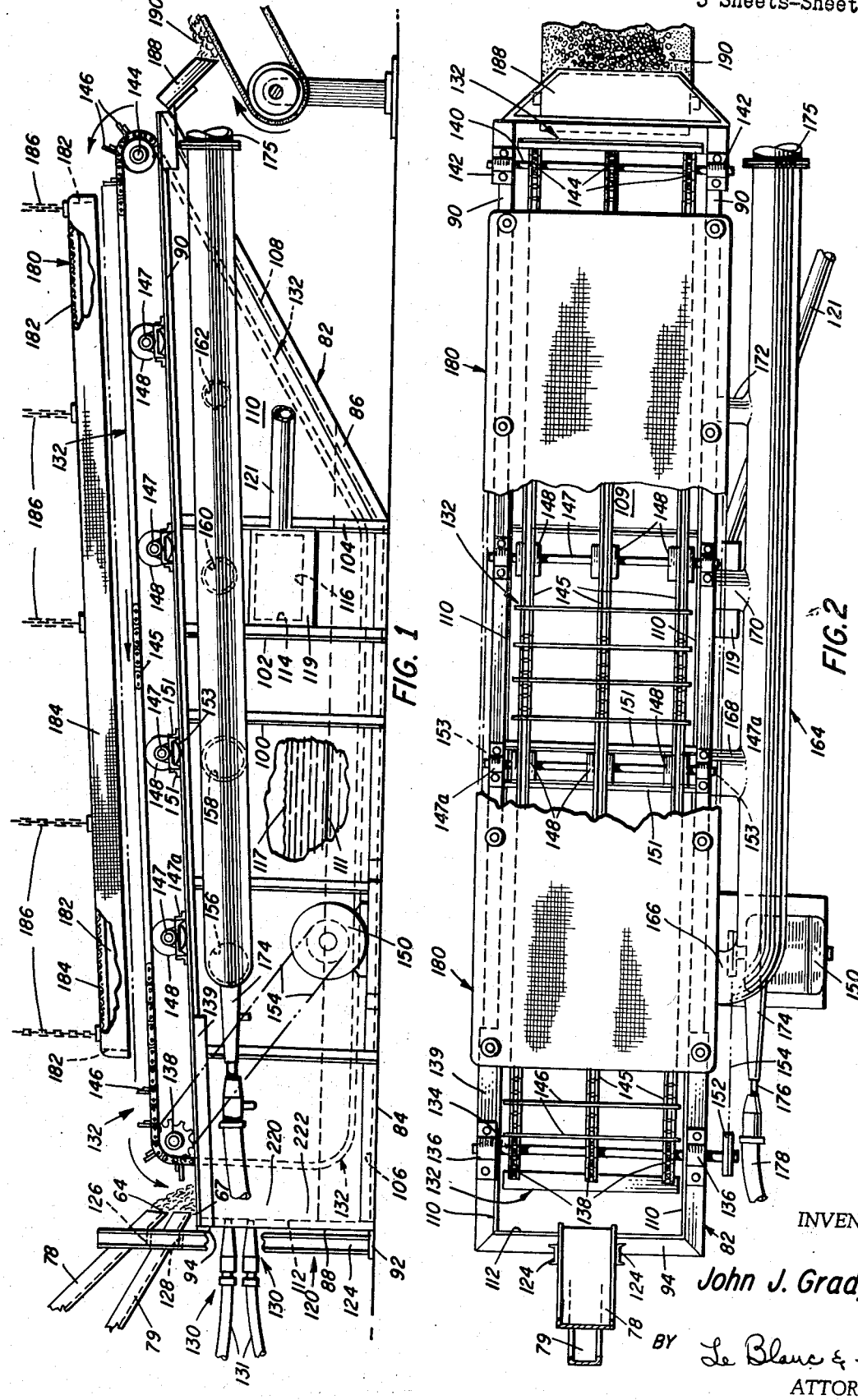

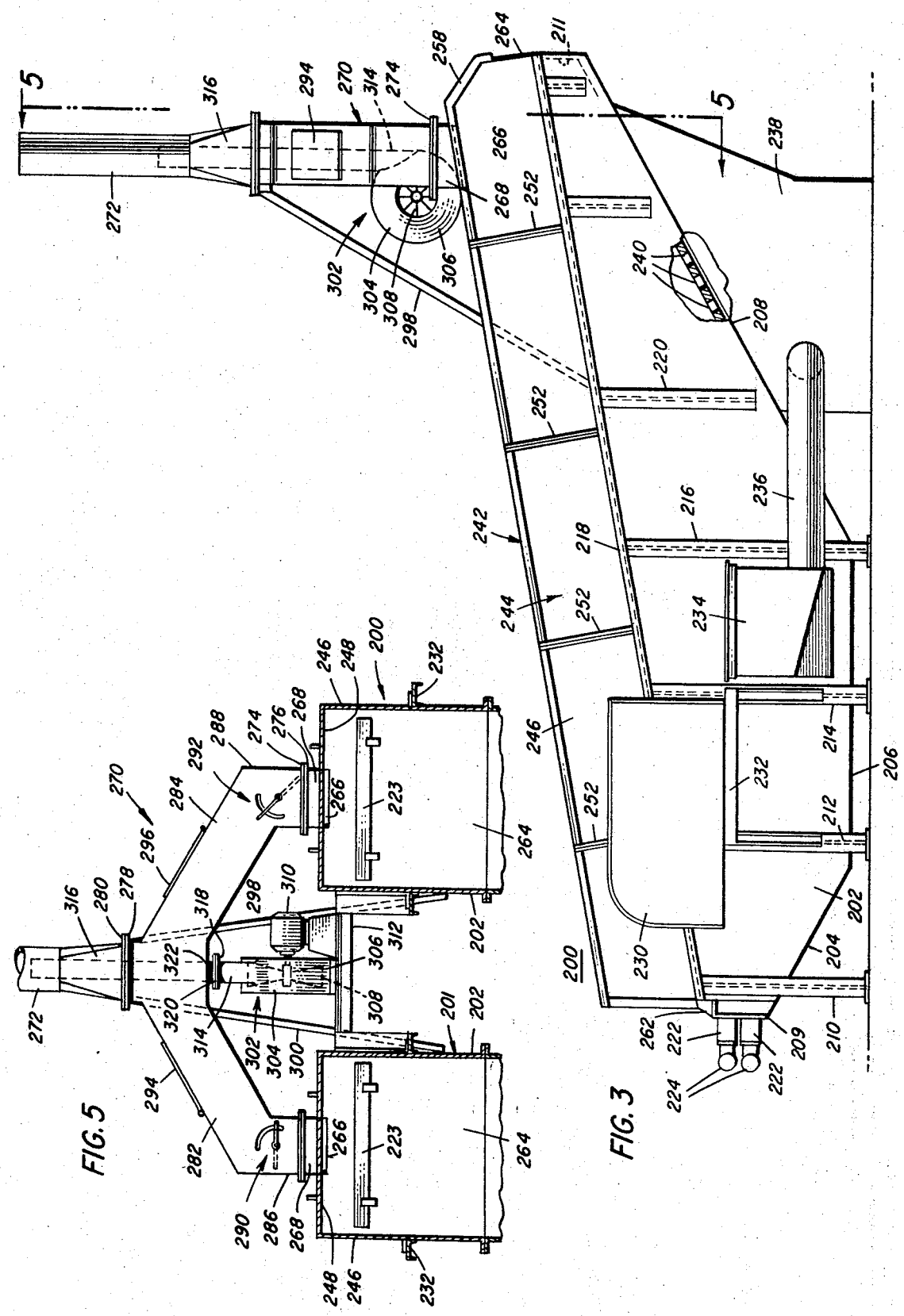

3,531,270
MOLTEN STEEL SLAG HANDLING METHOD
AND APPARATUS
John J. Grady, New Florence, Pa., assignor to International Steel Slag Corporation, Washington, D.C., a corporation of the District of Columbia
Continuation-in-part of application Ser. No. 428,519, Jan. 27, 1965, which is a continuation-in-part of application Ser. No. 126,792, June 28, 1961. This application Apr. 10, 1967, Ser. No. 629,755
The portion of the term of the patent subsequent to Apr. 25, 1984, has been disclaimed
Int. Cl. C03b 5/18
U.S. Cl. 65—19                                    18 Claims

ABSTRACT OF THE DISCLOSURE

A system is described for the improved processing and disposal of molten steel slag formed during the steel making operations. The system comprises a steel slag granulator having steam collecting and disposal means for collecting and transferring to a suitable disposal point, the steam generated during the slag granulation process. There is provided steam retaining means in the form of a suspended or bolted hood partially covering the slag granulator to prevent undesirable venting of steam at the granulator location. The steam collection means may comprise a common manifold and a series of connecting pipes, or alternatively, a breeching arrangement common to one or more granulators. The disposal means comprise a conduit of suitable construction, preferably including aspirator means cooperating with the steam collection means to establish a pressure differential between the interior of the granulator and the interior of the collection means for removal of steam from the granulator into the collection means and the disposal means.

This application is a continuation-in-part of my copending application Ser. No. 428,519, filed Jan. 27, 1965, entitled "Steel Slag Handling System," and now U.S. Pat. 3,316,075 which in turn is a continuation-in-part of my earlier application Ser. No. 126,792, filed June 28, 1961, and now abandoned. The disclosures of said applications Ser. No. 126,792, and Ser. No. 428,519, are incorporated by reference in the present application.

The present invention relates to a method and system for efficient, fast, and economical handling of slag discharge from a steel-making furnace and more particularly, to improved granulation techniques for processing red-hot slag from a steel-making furnace by converting the slag to a granular mixture of slag and metal particles of relatively small size and low temperature. Apparatus according to the present invention is of significance since it may conveniently be located in or close to the furnace building without causing disruption of the steel-making operation due to release of large quantities of steam in the working area.

As discussed in my aforementioned parent application, Ser. No. 428,519, the efficient, quick removal of large quantities of slag from steel making furnaces and out of the furnace building is a long-standing major problem in the manufacture of steel. For example, steel making in an open hearth furnace having a total capacity of 350 tons per heat, results in the formation of about 65 or 70 tons of slag, i.e., about 20% of the total furnace charge. A modern open hearth plant contains 10–15 stationary furnaces of 200–350 ton capacity, in substantially continuous operation on staggered heat cycles. Thus, a tremendous amount of slag must be removed from the furnace building each day, without interruption of furnace operation if maximum efficiency is to be maintained.

The problems of handling and removing steel slag have been seriously increased by the steel industry's rapid adoption, within the past few years, of oxygen steel making furnaces, sometimes called "OSM" or "BOF" furnaces. These furnaces are capable of producing steel in large quantities in short heat times. For example, one steel company in the United States has produced about 240 tons of steel in 27 minutes, tap-to-tap, compared to 6–8 hours in a modern open hearth furnace. However, such oxygen steel furnaces also form large quantities of slag, e.g., on the order of 12–16% of the heat tonnage. Thus, an OSM or BOF furnace producing about 200–250 tons of steel in 30–60 minutes will also produce an average of about 35 tons of molten slag in 30–60 minutes. These vast quantities of molten slag must be removed from the furnace and the furnace building, without interruption or delay in the actual operation of the furnace.

As described in detail in my parent application Ser. No. 428,519, it has been a longstanding common practice to discharge open hearth steel furnace slag into cast iron slag pots removable from the furnace building on rail cars. However, this slag pot system has proved inadequate and unsatisfactory for removal of large tonnages of slag, particularly as open hearth furnace capacity has increased, and melt time decreased. Thus, some leading steel plants have adopted a system of discharging the open hearth slag to the pit of the open hearth shop, and thereafter removing it from the furnace building by means of high lift tractors and heavy duty trucks. In the case of OSM or BOF furnaces, the prevailing method of handling and removing molten slag continues to be, by use of a large number of costly slag pots, moved by cranes and/or railcars from the furnace to a relatively remote slag dump. As amplified in my aforementioned parent application, these present multi-step batch methods of handling open hearth and OSM steel slags are not only costly from the viewpoint of slag handling but also have serious inherent shortcomings limiting useful capacity of the furnaces. Improvement of such prevailing methods of handling and disposing of increasing tonnages, especially in the case of OSM or BOF slag, in less time, has become critical in minimizing and avoiding production delays, and is a matter of serious concern to the entire steel industry.

The invention described in application Ser. No. 428,519 is directed to a system which provides a new improved steel slag removal system that departs from the slag materials handling concepts of current and earlier systems as described above, thereby avoiding numerous difficulties and making it possible to achieve continuous removal of slag from the furnace building with no delay in the steel making process. More particularly, application Ser. No. 428,519 discloses a new, improved slag handling method and apparatus whereby the red hot molten slag from the steel furnace is discharged into a "granulator" in which it is suddenly cooled and granulated by jets of water to form relatively small discrete particles of granulated slag and metal which are then discharged from the granulator and transported by continuous conveyor means to a suitable storage or disposal facility. The result is complete and continuous granulation and removal of slag even under conditions of maximum rate of slag discharge, without any interruption of the operation of the furnace. Hence, the improved slag handling system of my parent application eliminates removal delay which has prevented optimum use of improved oxygen techniques and shorter heat times with larger capacity furnaces. This new system also achieves other important objects and advantages as discussed in my parent application, including, quick, efficient, and economical magnetic separation of useable ferrous material from non-ferrous slag, with low cost material handling for each of them.

One of the principal features of the system described above, is means for efficient and convenient removal of steam generated as a result of contact between the relatively cold water and the red hot slag. As will be understood, most convenient operation for the granulator results when it can be located in close proximity to the steel making furnace to minimize transportation of the red hot slag. On the other hand, venting of large quantities of steam to the atmosphere within the furnace buildings is undesirable since it may interfere with steel making operations, or more seriously, pose a safety hazard to workers in the area, e.g. due to interference with vision. Even if it is possible to locate the granulator itself outside of the furnace building, the presence of large quantities of steam there may also be undesirable since certain activities supporting steel making operations take place in this area. Thus, wherever the granulator is located, it is desirable to provide means for preventing the uncontrolled venting of generated steam to the atmosphere. Since large quantities of steam may be generated under certain conditions, e.g. with high granulator water temperature and/or high slag input rate to the granulator, there should also be provided means for conveniently disposing of the steam at a desirable location.

Space is generally at a premium in and around the steelmaking shop, so that the steam removal system should be compact and efficient. Further, it is quite desirable that the steam removal means be as simple and rugged as possible.

Briefly, in accordance with the present invention, there is provided a steel slag granulator apparatus as described in detail in my parent application Ser. No. 428,519, comprising an open-topped, elongated granulator tank, a horizontal nozzle, or two vertically spaced horizontal nozzles, for injecting one or two flat jets of water into the tank, and a chute or other equivalent means for directing a stream of molten slag to intercept the water jets entering the granulator. In conjunction with the above, there is provided means for covering a substantial portion of the open top of the granulator, with steam collection means to exhaust substantially all of the steam generated in the granulator by creating a pressure differential between the interior of the granulator and the interior of the steam collection and exhaust means. Cooperating with the steam collection means is suitable conduit means for conducting the collected steam to the desired exhaust location. An embodiment is disclosed which is particularly suitable for providing concurrent steam exhaust facilities for a plurality of adjacent granulator tanks with minimum duplication of equipment.

Accordingly, it is a primary object of the present invention to provide an improved system for granulating hot molten steel slag, and in particular, to provide such a system including means for rapidly collecting and disposing of steam generated in the course of the granulation process. It is a related object of this invention to provide an improved steel slag granulating system having steam removal means for collecting steam generated during the granulation process and transporting it a sufficient distance before venting it to the atmosphere so as not to inconvenience or disrupt workers in the vicinity of the granulator.

It is an additional primary object of this invention to provide a system for granulating hot molten steel slag including steam removal means to prevent the emission of steam generated during the granulation process into the atmosphere around the steel making furnaces. It is also an object of this invention to provide a slag granulation system including means to collect and transport generated steam for convenient venting outside the furnace building in an area where it will not pose a safety hazard or interfere with normal steel making practice.

It is also an object of this invention to provide a steam removal system as described above which is readily adaptable to use in a minimum of available space. It is a related object of this invention to provide a steam removal system which is flexible in design, simple in construction, and relatively inexpensive to install. It is also an object of this invention to provide such a system requiring little or no maintenance.

It is a further object of this invention to provide a steel slag granulator including improved steam control means comprising a granulator cover for preventing direct emission of steam into the atmosphere and means for collecting and transporting the steam to the desired disposal location. It is a related object of this invention to provide such a steel slag granulator with a steam removal means including aspirator means for inducing the flow of steam out of the granulator into a collection and exhaust conduit.

It is an additional object of this invention to provide a granulator steam removal system which operates in accordance with certain important criteria set forth below so that satisfactory steam removal is achieved under substantially all operating conditions of open hearths, OSM, and other known steel making furnaces.

The exact nature of this invention as well as other objects and advantages thereof will be apparent from the following description and the accompanying drawing in which:

FIG. 1 is a side elevation, partially broken away, of a first embodiment of a granulator according to this invention, including an embodiment of the steam removal system;

FIG. 2 is a top plan view of the granulator of FIG. 1;

FIG. 3 is a side elevation of a second embodiment of a granulator according to this invention incorporating a modified steam removal system;

FIG. 5 is a vertical section taken along line 5—5 in FIG. 3 showing the details of the construction of the modified steam removal system.

Figure 4:
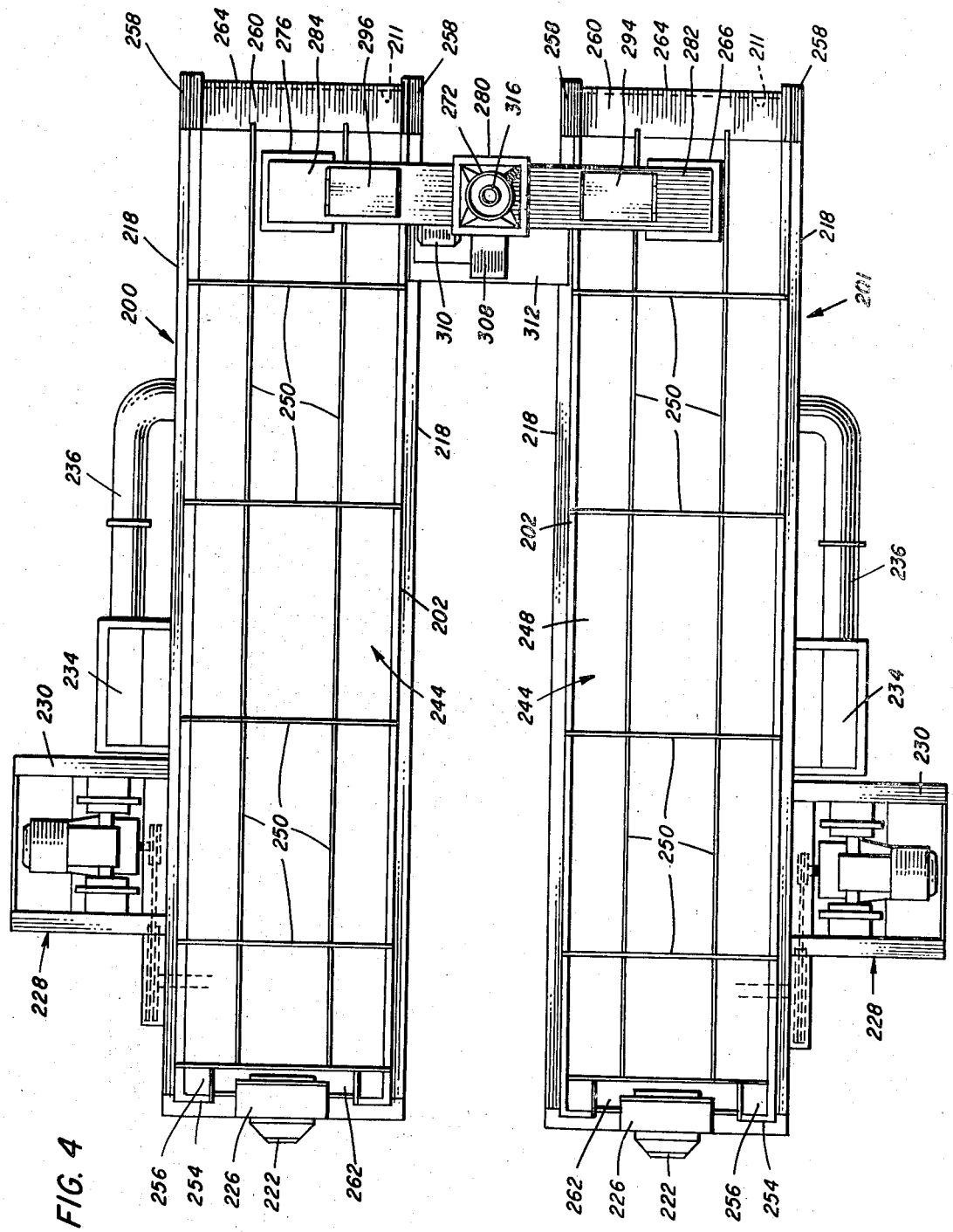
FIG. 4 is a top plan view of two granulators such as shown in FIG. 3.

For convenience, the reference numerals, where appropriate, are identical to those used in corresponding figures of drawing found in my copending parent application, Ser. No. 428,519.

Referring now to FIGS. 1 and 2, in a first embodiment of the present invention, granulator 82 comprises a large rectangular tank which is somewhat boat-shaped, as shown. In the illustrated embodiment, the granulator tank includes a framework comprising: a pair of angles 84 along the bottom longitudinal edges on opposite sides of the tank; a pair of angles 86 along the edges on opposite sides of the sloping tank bottom; a pair of angles 88 forming the vertical end posts at the input end of the tank (at the left in FIGS. 1 and 2); a pair of angles 92 and 94 forming the lower and upper edges of the same end of the tank; a pair of angles 90 forming the long sloping upper edges on opposite sides of the tank; and a plurality of angles 96, 98, 100 and 104 extending between bottom side angles 84 and top side angles 90, on both sides of the tank (as is especially apparent from FIG. 1) to form supporting framing for the longer tank sides. The granulator tank also comprises: a horizontally disposed rectangular bottom plate 106; a sloping bottom rectangular plate 108; a pair of like plate side walls 110, each having a configuration as shown in FIG. 1, and a rectangular end wall 112. The aforementioned components are welded, or otherwise suitably secured together to form a water-tight granulator tank of boat-like shape, in a manner known in the art.

One tank side wall 110 (the one shown in FIG. 1) is provided with a rectangular cut-out 114 of suitable size to provide a weir 116 for overflow of water in the tank, indicated at 117. The water flows from the tank of granulator 82 into a rectangular-shaped water discharge box 119, from which it is in turn carried away through a discharge pipe 121 for suitable disposal. (A discharge or recirculating pump may be provided in pipeline 121, if necessary or desired.) The top of the water discharge box 119 is preferably open to permit water to overflow the box in the event there is some sort of stoppage in the discharge pipe 121. An additional angle 102 is provided on the granulator tank side 110 which has the aperture 114 forming weir 116, so that the water discharge box 119 can be better supported between angles 102 and 104, as is especially apparent in FIG. 1.

As explained and illustrated in my parent application, a single granulator may be readily employed to handle the entire slag output from an open hearth furnace, i.e., both front flush and ladle (tap) slag, by an appropriate arrangement of troughs and runners leading to the granulator. Accordingly, in FIGS. 1 and 2 there are shown the discharge ends of two slag chutes 78 and 79 which carry the front flush slag 64 and the ladle slag 67, respectively, to the granulator. On the other hand, it will be understood that in other applications, e.g., granulation of OSM slag, a single slag chute may be employed. For the double chute embodiment of FIGS. 1 and 2, a suitable steel framework 120 is provided at the end of the granulator tank 82 nearest the furnace 20 to cradle the lower end of the front-flush slag chute 78 and the lower end of the ladle slag discharge chute 79. This chute supporting framework 120 comprises a pair of spaced channels 124 suitably secured in a vertical position to the rear of the tank of granulator 82 by welding or the like with two horizontal channels 126 and 128 suitably secured between vertical channels 124, so as to cradle and support the ends of slag spouts 78 and 79 which overhang the end of the granulator 82.

The end wall 112 of granulator 82 is provided with a pair of rectangular apertures that receive the forward ends of the nozzles 130 which are shown in detail in my parent applications (e.g., in FIGS. 5–7 of application Ser. No. 428,519). Briefly, however, each of nozzles 130 is so constructed as to issue the water therefrom in a horizontally elongated jet of substantially rectangular cross section, the width (i.e., the dimension extending transversely of the granulator) being substantially greater than the height (i.e., the vertical dimension). Moreover, as further specified in my parent applications, the width of nozzles 130 is preferably such that irrespective of the transverse position of slag chutes 78 and 79 relative to the granulator end wall 112 each nozzle extends transversely beyond the sides of chutes a distance of at least 5% of the total chute width. Nozzles 130 also include suitable mounting plates or other means for convenient attachment to end wall 112 of the granulator tank.

Water is fed through the nozzles 130 from a pair of conduits 131 under substantial pressure, supplied by suitable commercially available pump means (not shown), whereby the water is expelled from the rectangular openings of each of nozzles 130 in a flat jet stream as previously explained. The hot slag which spills into the end of granulator tank 82 from front flush chute 78 and ladle slag chute 79 intercepts these flat streams of water from jet nozzles 130, causing the slag to be rapidly chilled and granulated. This results in the production of relatively finely divided discrete pieces or particles of solid metal, solid ferrous ore, non-ferrous slag and gangue. This granulation of the molten steel slag is achieved by a combination of mechanical disruption of the molten steel slag discharged into the granulator 82 and chilling of the slag by the water jet streams from nozzles 130 (particularly the upper nozzle).

The granulator 82 is provided with an endless scraper or rake-type flight conveyor, which is generally indicated by the numeral 132. This conveyor comprises a driven head shaft 134 which is mounted at each end in suitable bearings 136 supported on the upper longitudinal edges of the input ends of granulator tank 82 with three toothed sprockets 138 non-rotatably secured thereon. The bearings 136 are mounted on the sides of the granulator tank in any suitable manner, but preferably on a pair of larger-sized angles 139 of suitable length secured to the upper tank-frame angles 90.

A tail shaft 140 is provided with its ends rotatably mounted in suitable bearings 142 on the sides of granulator tank 82 adjacent its "prow end," and has three tail shaft rollers 144 non-rotatably secured to shaft 140, one each being in longitudinal alignment with one of the toothed sprocket wheels 138, as shown in FIG. 1. An endless link-belt log chain 145 extends over each of the three sets of aligned sprockets 138 and tail rollers 144, with part of each chain being suspended near the bottom plates 106 and 108 of the granulator 82 (as amplified in my aforesaid application Ser. No. 428,519). Rectangular steel flights 146 are each secured to an upstanding portion of three corresponding transversely aligned attachments in chains 145 by machine bolts, thereby providing a plurality of drag flights extending substantially across the width of the granulator tank 82 at small spaced intervals on the chains 145. The lower sections of the chain flight conveyor 132 are located near the tank bottom plates 106 and 108 so that the flights 146 will rake the granulated slag and metal in granulator 82 to the upper prow end of sloping bottom plate 108.

A plurality of return idler roller shafts 147 are suitably rotatably mounted across the open top of the granulator tank, with three rollers 148 non-rotatably secured on each of shafts 147, to support at spaced points the upper stretch of each of log chains 145 and flights 146. The ends of the return idler shafts 147 are rotatably mounted in any suitable bearing on a suitable support means 149. For example, support means 149 may comprise a pair of spaced angles 151 extending transversely across the top of the granulator tank 82, with their ends welded or otherwise secured to upper tank edge angles 90; and short pieces of channel iron 153 secured between angles 151 over angles 90 to provide brackets for the bearings 147a in which the ends of idler shafts 147 are rotatably mounted.

The flight chain conveyor 132 is driven in the direction indicated by the arrows in FIG. 1 by a variable-speed electric motor 150, which is supported on or adjacent the granulator 82 and drivingly connected to the conveyor drive shaft 134 by means such as a belt 154 driving pulley 152 on shaft 134.

It will be noted that the slag can be discharged from chutes 78 and 79 into the water in granulator 82 through the flights 146 of the rake conveyor 142. Thus, continuous conveyor operation does not interfere with the discharge of the slag from the open hearth furnace into granulator 82, especially during the periods of maximum front slag flush when the slag may be thrown forward from the end of chute 78 as it spills into granulator 82.

Operation of the rake conveyor 132 during the granulation of slag in the granulator 82, as previously discussed, causes the resultant granulated particles of metal and slag to be dragged along tank bottom 106 and sloping plate 108 by flights 146 so that the granulated mixture is ultimately discharged from granulator 82 to an inclined chute 188 mounted at the upper prow end of the granulator (by any suitable support means not shown for clearer illustration of other parts in the drawings). The granulated mixture of slag and metal particles then spills from chute 188 onto an endless moving conveyor belt 190, of any conventional or desired type, for disposal or storage, or further processing by the magnetic separator arrangement described in my parent application, Ser. No. 428,519.

Alternatively, sloping bottom plate 108 and wear plate 109 may be removed, and a perforated plate, not shown, substituted so that the granulated slag and a substantial quantity of water will fall into a mixing tank located below the prow end of the granulator 82 as the slag is carried along by rake-conveyor 132. The slag-water mixture is removed from the mixing tank by a dredge pump and transported through suitable piping for further processing as described more fully in my copending U.S. patent application entitled Steel Slag Handling System, Ser. No. 535,143, filed Mar. 17, 1966, and now abandoned as a continuation-in-part of my patent applications Ser. No. 126,792 and Ser. No. 428,519. Said application Ser. No. 535,143 discloses in detail a modified granulator with hydraulic means for transporting granulated slag discharged from the granulator.

As shown in FIG. 1, one side wall 110 of granulator 82 is provided with a plurality of apertures 156, 158, 160 and 162, above the water line 117 (which is determined by the location of weir opening 114 and the quantity of water and granulated slag and metal in the granulator 82). A manifold 164, which has a configuration substantially as shown in FIGS. 1 and 2, is mounted on the side of the granulator 82 by suitable support means (not shown to permit clearer illustration of other parts), and includes lateral ducts 166, 168, 170 and 172 whose ends are suitably secured by a conventional gas-tight arrangement to the granulator side wall 110 around the apertures 156, 158, 160 and 162, respectively. The apertures 156, 158, 160 and 162, and their related manifold ducts 166, 168, 170 and 172, enables steam to be removed along the length of granulator tank 82, from the slag input end to the prow end.

A pipe 174, including a conventional venturi 176, is suitably connected to an aperture in the rearward elbow of the manifold 164; and there is in turn coupled to this an air hose 178 for supplying air to the elongated main section of manifold 164. As will be apparent, the granulation of hot slag spilling from the chutes 78 and 79 into the water jets from nozzles 130 in granulator tank 82 may cause a substantial quantity of steam to be generated, and this preferably should not be permitted to enter the atmosphere in the vicinity of the granulator for reasons discussed above. Accordingly, during granulator operation, air is supplied at a suitable pressure to the manifold 164 from the venturi inlet pipe 174, 176. This creates an aspirator effect which lowers the pressure in manifold ducts 166, 168, 170 and 172, whereby the steam exits from the tank of granulator 82 through side apertures 156, 158, 160 and 162 into the main conduit of the manifold 164. The steam is then conducted through suitable conduit 175 for disposal, as, for example, by venting to atmosphere at some convenient location. If necessary or desired, an exhaust fan arrangement capable of handling steam can be supplied in the steam conduit system connected to steam manifold 164 to assure adequate removal of steam, size of conduits, distance to venting, etc.

In addition, to avoid having steam generated within the granulator tank 82 pass off into the atmosphere from the top of the tank, the granulator 82 is preferably also provided with a suitable hood generally indicated at 180 in FIGS. 1 and 2. As illustrated, steam hood 180 comprises a rectangular box-like framework, made up of pipe or wood members indicated at 182; and the upper part on sides of framework 182 is covered with a suitable material 184, such as heavy canvas, for preventing egress of steam from the granulator 82 into kitchen 26. Steam hood 180 is preferably supported over the tank of granulator 82 with one end spaced a sufficient distance from granulator end well 112 so that the slag discharged into the granulator 82 from the chute 78 (and 79) does not spray the steam hood 180; and the other end of hood 180 is adjacent the "prow end" of the granulator 82. As illustrated, steam hood 180 is supported in spaced relation to the granulator 82, slightly clearing the top of conveyor flights 146. Hood 180 is preferably supported by a plurality of chains or cables 186 secured at their upper ends to the ceiling above the granulator and at their lower ends to the steam-hood framework 182, as illustrated in FIG. 1 of the drawings, whereby the steam hood 180 will "float" above the granulator, thus preventing rupture of the hood walls 184 by excessive steam. If desired, the steam hood 180 may be suspended by suitable conventional hoist means so that it can be conveniently raised to provide access to the parts of granulator 82 below the hood. Where overhead support is infeasible or undesirable, steam hood framework 182 may be directly attached to granulator 82. Alternatively steam hood 180, in this case preferably in the form of a heavy metal plate may be directly attached to the granulator. In either case, it will be understood that the steam hood 180 should be so mounted as not to interfere with the movement of rake-conveyor 132 in its passage over return idlers 148.

The mode of operation of the system described above is as follows: During the steel-making operation, the hot molten slag spills into the rear end of the granulator 82, and intercepts the two horizontally extending jets of water emitted from the upper and lower nozzles 130. The molten slag is broken up by force of the jets and rapidly chilled by the water jet streams in the air above the level of water bath 117 in granulator 82, thus converting the slag into a relatively finely divided granulated solid product which consists of discrete particles of solid metal and solid slag, with the metal particles being substantially free of adhering slag, so that the metal and slag particles may later be readily separated. The granulated particles of slag and metal fall into the water bath 117 in the bottom of the tank of granulator 82, where they are further cooled. The action of rake conveyor 132 moves the resultant granulated particles of metal and slag falling to the bottom of the granulator tank so as to discharge the granulated slag from the upper prow end of granulator 82 to a transport means such as chute 188 and associated continuous belt conveyor 190. The rake conveyor 132 within granulator 82 is an advantageous feature of the steel-slag granulation system of this invention as amplified in my aforesaid application, Ser. No. 428,519.

Steam formed during the granulating of the slag is contained within the granulator by steam hood 180, and carried off through manifold 164 and connected conduits 175 due to the air input from pipe 174, and is ultimately vented to atmosphere at some location where it will present no safety hazard or interference with steel-making operations.

Referring now to FIGS. 3–5, there is shown an alternative improved embodiment of granulator steam removal system which may advantageously be used, with one, or two or more granulators. When the described steam removal system is used with two or more adjacent granulators, it permits a substantial sharing of system components by such adjacent granulators with consequential reduction of cost and space requirements plus providing operational back-up in event of malfunction of one granulator.

Thus, with particular reference to FIGS. 3 and 4, there is shown a pair of granulators 200 and 201 similar to granulator 82 described above, each comprising a large rectangular tank of somewhat boat-shaped configuration. The sides of each of granulators 200 and 201 are formed of plates 202 having a configuration as shown, while the bottoms are formed of three generally rectangular plate sections 204, 206, and 208. An end wall 209 is welded or otherwise secured to the bottom edges of sidewalls 202 and to bottom plate 204. The above structure including sloping bottom plate 208 provides a complete watertight unit. The granulator tanks may be supported by a plurality of vertical angle members 210, 212, 214, and 216, on each side and by pairs of elongated side angle members 218, attached to the upright frame members 210–216. Additional framing (not shown) and frame members like 220 may be provided to assure structural rigidity if necessary or desirable.

As in the case of granulator 82 of FIGS. 1–2, granulators 200 and 201 of FIGS. 3–5 each include a pair of vertically aligned jet nozzles 222 secured in suitable openings in granulator end walls 209 and a pair of attached nozzle feed lines 224 fed from a common water input line (not shown) to provide the required water for safe and efficient granulator operation. Directly above nozzles 222 are positioned slag chute supporting members 226 (see FIG. 4) upon which are supported the discharge ends of a slag chute (not shown) and for each of granulators 200 and 201. Granulators 200 and 201 each also include rake conveyors 223 (see FIG. 5) similar to that shown at 132 in FIG. 2, operated by rake drive units 228 shown in FIG. 4. Rake drive units 228 are disposed within protective housings 230 mounted on supporting platforms 232, secured, for example, to granulator frame members 212 and 214.

In the embodiment shown in FIGS. 3–5, granulators 200 and 201 each include hydraulic slag transport means as described in detail in my aforementioned co-pending application Ser. No. 535,143, including a mixing tank 238 communicating with the granulator tank through a series of perforations 240 in sloping bottom plate 208.

As shown in FIG. 3, each granulator includes an overflow discharge box 234 similar to 119 in FIG. 1 to permit the overflow of water from the granulator tank. A discharge conduit 236 is connected to an opening in box 234 through which the overflow water is transferred to mixing tank 238 and transferred by hydraulic means such as described in detail in my application Ser. No. 535,143 However, it should be recognized that the slag conveyor system shown in FIGS. 1 and 2 may readily be substituted if desired for the hydraulic transport system shown in FIGS. 3–5.

The steam removal means of embodiment of FIGS. 3–5 generally denoted at 242, differs from, and is an improvement on, the corresponding steam removal means of FIGS. 1 and 2 in the manner now to be described. The modified steam removal system is especially convenient for use with a plurality of colsely spaced granulators, as shown in FIGS. 4 and 5, although it is adaptable to use with a single granulator as in FIGS. 1 and 2.

As shown in FIGS. 3–5, the modified steam removal system 242 includes a steam hood 244, preferably made of steel plates of generally rectangular configuration welded or otherwise secured to elongated angle members 218 at the top of each of granulators 200 and 201. For example, steam hoods 244, as shown, are each formed of a number of rectangular side plates 246 and top plates 248 welded or otherwise secured to a plurality of top angle members 250 and side angle members 252. The ends of each of steam hoods 244 are at least partially open at 262 and 264 and are formed, for example, by a pair of angle members 254 and small overlying plates 256 at the input end, and by a further pair of angle members 258 and an overlying plate 260 at the discharge end.

As shown in FIGS. 3 and 4, each of the steam hoods 244 terminates a sufficient distance from the corresponding end wall 209 of granulator 200 and 201 to permit, respectively, convenient input of molten slag through hood opening 262 adjacent to granulator end. Similarly, each of steam hood end plates 260 terminates above the respective granulator end wall 211, forming an opening 264 (see FIGS. 3 and 5) to facilitate the ejection by the rake conveyors 223 of oversized pieces of slag and debris which do not pass through the openings in perforated plates 208 and 240 (or of the entire slag output, in event of use of a conveyor, rather than hydraulic slurry transport, to dispose of the granulated slag). In addition, the openings 262 and 264 at the ends of the granulators permit sufficient inflow of air to facilitate removal of generated steam as explained below, while providing emergency escape means for steam if excessive quantities should suddenly be formed.

As shown in FIGS. 3–5, at the discharge end of the granulators 200 and 201, the steam hoods 244 are each provided with a generally rectangular opening 266 in one of the top plates 248. Secured around each of openings 266, is a short segment of ducting material 268, of generally rectangular cross section. This forms a connecting collar for a further system of ducting, generally denoted at 270, which serves as a breeching between the granulators 200 and 201 and a common exhaust stack 272. As shown in FIG. 3, breeching 270 is attached by means of an outwardly extending peripheral flange 274 to a corresponding flange 276 on connecting collar 268. Similarly, as shown in FIGS. 3 and 5, breeching 270 is connected by means of a further outwardly extending peripheral flange 278 to a corresponding flange 280 on exhaust stack 272. Breeching 270 and exhaust stack 272 are preferably formed of or lined with a suitable alkaline resisting material or the equivalent to prevent damage by corrosive components of fumes generated during slag granulation and combined with or carried by the steam evolved.

As shown in FIG. 5, breeching 270 is of a generally inverted V-shape, having a pair of converging sections or arms 282 and 284, and vertical connecting segments 286 and 288, thereby serving in common both of adjacent granulators 200 and 201. On the other hand, it should be understood that the actual configuration of breeching 270 may vary, e.g., depending on the number of adjacent granulators to be served in common and therefore may include additional arms connected to other granulators, or may even be a simple vertical or sloping segment intended for use with only a single granulator. Suitable dampers 290 and 292, positioned in the vertical segments 286 and 288 of breeching 270, serve to control the rate of steam and air flow from the individual granulators, while hinged doors 294 and 296 in converging arms 282 and 284, respectively, provide convenient access. Breeching 270 and stack 272 are rigidly constructed and are preferably self-supporting. However, in many cases, the structure will be quite large, as, where remote steam discharge is required. Thus, suitable support of a conventional form may be employed. or example, a pair of supporting struts 298 and 300 may be connected as shown in FIG. 5 between the lower portion of stack 272 and the adjacent side walls 202 of granulators 200 and 201. The exact configuration of exhaust stack 272, as well as its mode of support will depend on the specific application, as will be understood by one skilled in the art in light of the disclosure herein.

Because of the large volume of steam which must be removed in a relatively short period of time, it has been found desirable to employ fan or like means to provide forced movement of steam from the granulators 200 and 201. On the other hand, the steam has dissolved and/or carries corrosive materials plus small slag particles and dust entrained in the steam, which will corrode and erode any exhaust fan or like means inserted directly in breeching 270 or exhaust stack 272, causing operational and maintenance problems. Thus an aspirator arrangement, generally denoted at 302, and best shown in FIGS. 3 and 5 is employed.

Aspirator 302 comprises a blower 304 comprising a housing 306, and a fan 308 driven by electric motor 310. Blower 304 and motor 310 are supported on a suitable platform 312 bridging the space between adjacent granulators 200 and 201. Platform 312 may rest at ground or floor level between granulators 200 and 201, but preferably is firmly secured to the adjacent sidewall 202 of the granulators.

Blower housing 306 includes an upwardly extending discharge portion 314 coupled to an elongated conduit 316 by a pair of matching flanges 318 and 320. Conduit 316 passes through an opening 322 in the lower wall of breeching 270 and extends upwardly into exhaust stack 272. Conduit 316 serves as an air injection tube, and therefore must extend beyond the breeching 270 a substantial distance, e.g. about 4 feet, into stack 272. The exact distance will depend on the configuration of the breeching and the exhaust stack and upon the location of opening 322, but in any event, it must be sufficient so that the air injected by the blower 304 creates a partial vacuum in the lower portion of stack 272 and in breeching 270. Sufficiently low pressure is thereby provided above openings 266 in granulator hoods 242 so that steam generated during operation of the granulators is drawn up through the breeching 270 into exhaust stack 272 for disposal at the desired location. While some partial exhaust can be achieved due to the draft created in exhaust stack 272 by the natural tendency of the steam to rise, it has been found that forced ventilation, as by the above described aspirator arrangement 302 is necessary to assure adequate steam removal under typical conditions of granulator operation.

In accordance with the present invention, and as set forth in detail in the above-mentioned U.S. patent application, Ser. No. 428,519, proper operation of the granulator system has been found to depend on maintenance of certain defined parameters, particularly with regard to the relationship between the tonnage per minute of steel slag input and both the quantity and velocity of water being injected through the granulator nozzles 130 or 222. Further, the quantity of steam generated during the granulation process has been found to depend upon the quantity of the incoming slag and the cooling of the water supplied by the nozzles 130 or 222. Thus, design of the steam removal system according to this invention must take into account these same factors to achieve satisfactory operation.

In particular, and as set forth in the aforementioned U.S. patent application, Ser. No. 428,519, the granulation system of this invention should preferably be operated according to the following conditions:

(1) Water should be supplied to appropriately sized granulator nozzles 130 or 222 in such quantity that the flat jet stream of water is injected into granulators 82 or 200 (and 201) at a jet velocity in feet per second (f.p.s.) and in gallons per minute (g.p.m.) varying in relation to the rate at which molten steel furnace slag is poured into the granulators to intercept the water jets, as follows: (a) For a molten slag input rate of up to about 2 tons per minute, at least one flat water jet stream at a jet velocity of at least about 25.0 f.p.s. and at least about 400 g.p.m. (b) For a molten slag input rate of 2 tons to about 4 tons per miunte, at least one flat water jet stream at a jet velocity of at least about 30 to 36.5 f.p.s. and at least about 500–600 g.p.m. (c) For a molten slag input rate of 4 to about 7 tons per minute, inject at least about 1200–1800 g.p.m., either by two flat water jet streams through two nozzles, one over the other, each water stream having a jet velocity of at least about 36.5 to 55 f.p.s.; or through one flat water jet stream via one nozzle with a jet velocity of at least about 73 to 110 f.p.s. (d) For a molten slag input rate of over 7 tons per minute, e.g., 7–8, inject at least 1800–2000 g.p.m., either by two flat water jet streams through two nozzles, one over the other, each water stream having a jet velocity of at least 55 to 61 f.p.s., or through one flat water jet stream via one nozzle with a jet velocity of at least about 110 to 122 f.p.s.

(2) Water should be introduced into each granulator at a quantitative rate in gallons per minute varying in relation to the rate at which molten steel furnace slag is poured into the granulator as follows: (a) Water should be introduced into granulator 82 (or 200 or 201) at the slag input end at an average rate of at least about 400 g.p.m. per ton of steel slag per minute poured into the granulator. (b) However, water should preferably be introduced at the slag input end of the granulator 82 at an average rate of about 900–1350 g.p.m. per ton of steel slag per minute poured into the granulator. (c) And, it is best to use at least about 1350–1600 g.p.m. per ton of steel slag per minute poured into the granulator to avoid objectionable vaporization and formation of steam. The input water preferably should be at typical water-main temperature (e.g., 60° to 70° F.); however, furnace-cooling water or other plant-used water may be employed, but its temperature preferably should not greatly exceed about 100° F. However, it is feasible to use input water of temperature significantly exceeding 100° F. when using a steam removal system according to conditions hereafter discussed.

(3) It is preferable that the amount of water per paragraph (2) be introduced by means of the jet nozzles 130 or 222 in such quantitative g.p.m. rates according to varying molten steel slag tonnage input rates. However, in the disclosed embodiments, the size of the jet nozzles is such that desired water jet velocities and g.p.m. per parts (a), (b), (c) and (d) of paragraph (1) above frequently can be achieved with a lower quantity of water through the nozzles than required to meet the conditions of parts (a), (b) or (c) of paragraph (2). In such event, it is possible to introduce the requisite water per paragraph (1) through the jet nozzles to achieve at least the water jet velocities and g.p.m. set forth in paragraph (1) above, and to introduce the remainder of the water per paragraph (2) by other means; e.g., a water pipe of suitable size may be secured to end walls of granulators below the lowest nozzle to supply additional water to each granulator by conduit from a suitable source. However, the safest and best approach is to introduce all water requirements per paragraph (2) into the granulators through the water jet nozzles. This increases the effectiveness of the water jets for breaking down the molten steel slag into small particles to achieve more rapid and more efficient slag cooling and granulation, and helps assure smaller resultant granulated slag particles for more efficient hydraulic slurry transportation when employed.

(4) In light of the foregoing, good results can be achieved by operating the granulator system of this invention using two flat jet streams of water injected horizontally into each granulator through two like-size nozzles 130 or 222, one over the other, according to the following: (a) For molten slag input of up to about 2 tons per minute, inject two water streams with jet velocity of about 36.5 to 61 f.p.s., and about 1200–2000 g.p.m. through both jets. (b) For a molten slag input rate of 2 to about 4 tons per minute, inject two water jet streams at a velocity of at least 61 to 122 f.p.s., and about 2000–4000 g.p.m. through both jets. (c) For a molten slag input rate of 4 to about 7 tons per minute, inject two water jet streams at a velocity of at least about 91 to 146 f.p.s., and about 3000–5000 g.p.m. through both nozzles.

(5) Granulation of the molten steel slag is generally largely accomplished by the flat water jet stream from the upper nozzle 130 or 222 with the lower water jet stream from lower nozzle 130 or 222 supplementing the upper jet stream and also providing a safeguard against malfunction of the upper water jet while molten steel slag is being poured. Thus, more effective granulation of the molten steel slag may be achieved by injecting ⅗ to ¾ (60–75%), and preferably ⅔ (66.6%), of available water through the upper of two like-size nozzles 130 or 222 (14″ x ⅜″ opening, one over the other, aligned), and injecting the balance of the water through the lower nozzle. Thus, in light of the foregoing, good results can be achieved according to the following: (a) For a molten slag input rate of up to about 2 tons per minute and using water available at about 1200–2000 g.p.m., inject about 800–1350 g.p.m. (⅔) through the upper nozzle at about 49 to 82 f.p.s., and about 400–650 g.p.m. (⅓) through the lower nozzle at about 25 to 39.5 f.p.s. (b) For a molten slag input rate of 2 to about 4 tons per minute and using water available at about 2000–4000 g.p.m., inject about 1350–2700 g.p.m. (⅔) through the upper nozzle at about 82 to 164 f.p.s., and about 650–1300 g.p.m. (⅓) through the lower nozzle at about 39.5 to 79 f.p.s. (c) For a molten slag input rate of 4 to about 7 tons per minute and using water available at 3000–5000 g.p.m., inject about 2000–3350 g.p.m. (⅔) through the upper nozzle at about 122 to 202 f.p.s., and about 1000–1650 g.p.m. (⅓) through the lower nozzle at a velocity of at least about 61 to 101 f.p.s.

For the operating conditions set forth in paragraphs (1)–(5) above, varying amounts of steam are found to be generated, and correspondingly, must be exhausted from the granulator. A significant factor which affects the quantity of steam generated, is the relationship between the rate of water input to the granulator in relation to the molten slag input rate. Another factor is the source of molten slag. As a general rule, other things being equal, it is found that granulation of open hearth tap (ladle) slag usually results in generation of greater quantities of steam than does the granulation of open hearth flush slag; granulation of typical OSM or BOF slag usually results in production of steam in quantities between steam from open hearth tap and flush slags, generally slightly below that for tap slag. The temperature of the water being injected into the granulator also affects the quantity of the steam produced, but the effect varies depending on the rate of molten slag input to the granulator, especially at high tonnage slag input rates which will generate considerable steam.

Modern OSM or BOF furnaces are producing increasingly large tonnages of steel in ever shorter heat times, with resultant increasing quantities of molten slag which must be disposed of in constantly decreasing time periods. This is making it necessary to "load" the granulator at a relatively high input of molten slag tons per minute while there are other practical and economic limits on the size of the granulator and hydraulic (or other) granulated slag transport, water available, etc.

Accordingly, the steam removal system, and particularly a blower-venturi 304 arrangement such as in the embodiment of FIGS. 3–5 (or the air source and venturi 176 for the embodiment of FIGS. 1 and 2) should have sufficient capacity to provide removal of certain minimum quantities of steam in light of operating conditions for type of steel slag being granulated in accordance with the following:

(6) For the granulator operating conditions set forth in paragraph (2) and (3) above, in which a minimum water input and jet velocity (per paragraph (1) above) is supplied through granulator nozzles 130 or 222, and an additional quantity of water is introduced, either through supplementary inlet pipes, or through the nozzles themselves, the required minimum steam removal capacity will vary from a high value of approximately 44.0 thousand cubic feet of steam per minute (c.f.m.) to a low of about 32.6 thousand cubic feet of steam per minute for water being injected into the granulator at a rate of 400 gallons per minute for a molten slag input of about one ton per minute. For a water input of 1600 gal./min. and a slag input of 1 ton/min., the minimum required steam removal capacity varies from about 16.1 thousand cubic feet of steam per minute to a considerably lower value of less than 1000 cubic feet of steam per minute. Considerable variation between these values is found as set forth in Table I below, which indicates the minimum ranges of steam removal capacity necessary for varying rates of water input in relation to the slag input rate, for input water varying in temperature from approximately water main temperature (e.g., 60–70° F.) to temperatures of approximately 100° F. and higher.

TABLE I.—RANGE OF MINIMUM STEAM REMOVAL CAPACITY FOR SLAG INPUT OF ONE TON/MINUTE

| Water input, gal./min. | Range of minimum steam revoval capacity, 1,000 c.f.m. | |
| --- | --- | --- |
| | Low value | High value |
| 400 | 32.6 | 44.0 |
| 900 | 15.4 | 32.4 |
| 1,350 | (¹) | 22.5 |
| 1,600 | (¹) | 16.1 |

¹ Minimal steam, e.g., less than 1,000 c.f.m. generated under these conditions.

The ranges given in Table I above apply to a molten slag input to the granulator at a rate of about 1 ton per minute. The water input should be increased for greater slag tonnages per minute, but it need not be increased proportionately, provided that the steam removal capacities are also increased approximately in proportion to the increase in slag tonnage.

(7) Thus, for the preferred range of operation conditions set forth in paragraph (4) above, in which mnimum water requirements set forth in paragraph 1 above are supplied through the granulating nozzles, Table II below gives the range of minimum required steam removal capacities for various slag input tonnage rates, using granulating water varying between about 60 and 70° F. (typical water main temperature) and 100° or more.

TABLE II.—RANGE OF MINIMUM STEAM REMOVAL CAPACITY; PREFERRED GRANULATOR OPERATING RANGES

| Slag input, tons/min. | Total water input, gal./min. | Range of minimum steam removal Capacity, 1,000 c.f.m. | |
| --- | --- | --- | --- |
| | | Low value | High value |
| Up to 2 | 1,200–2,000 | 51.9–24.2 | 76.0–59.9 |
| 2–4 | 2,000–4,000 | 24.2–48.4 | 59.9–120.0 |
| 4–7 | 3,000–5,000 | 82.8–154.0 | 143.0–258.0 |

It may be seen from Table II that considerably more steam is generated for a water input which is low in relation to the slag input rate.

For granulation of molten open hearth tap slag, the minimum steam removal capacities indicated as the high values in Tables I and II should be provided. For granulation of open hearth flush slag, the lower values of minimum steam removal capacity are sufficient. For granulation of OSM or BOF slag, an intermediate steam removal capacity, usually tending toward the high value for a given water input rate, is generally required.

As may be seen, substantially less steam is generated with larger quantities of water relative to the slag input rate. On the other hand, external factors may limit the quantities of water available for operation of the granulators and a larger minimum steam removal capacity may be necessary to meet such contingencies.

In light of the above, the following conditions are typical of suitable operation of an OSM steel slag granulating system in accordance with this invention, under typical conditions: A total quantity of as much as 37.5 tons of molten OSM steel slag may be discharged into the granulator system over a period of approximately 10–11 minutes; there may be significant variation in the sought-for-average 3.5 tons per minute rate for slag poured into the granulator due to practical difficulty in getting a precisely controlled pour. Under such conditions, water is provided to the granulator at the rate of approximately 3500 gallons per minute, equally divided between the upper and lower granulating nozzles and injected into the granulator with a jet velocity of between about 105 and 110 feet per second for each nozzle. Under such circumstances, a minimum steam removal capacity of between about 90–100 thousand cubic feet per minute should be provided.

Variation in design of the steam removal equipment described may be achieved in a manner apparent to one skilled in the art in light of this disclosure to assure minimal steam vented around the granulator area.

Thus, the invention may be embodied in other specific forms without departing from the spirit or essential characteristics thereof. The present embodiment is therefore considered in all respects illustrative, and not restrictive, the scope of the invention being indicated by the appended claims rather than by the foregoing description and all changes which come within the meaning and range of equivalency of the claims are therefore intended to be embraced therein.

What is claimed is:

1. A method for handling molten steel slag from a steel-making furnace comprising: pouring molten steel slag into a receptacle; injecting at least one jet stream of water into said receptacle to intercept the molten steel slag and to granulate said slag into particles; said water stream being injected at a rate of at least 400 gallons per minute per ton of molten slag input per minute, with a water jet velocity ranging from at least about 25 feet per second for a molten slag input rate of up to 2 tons per minute, to at least about 55–61 feet per second for a slag input rate of up to about 7 tons per minute; maintaining water accumulating in said receptacle at a level below said jet stream at all times while molten slag is being poured into the receptacle, so that said molten steel slag intercepts said jet stream above the level of water accumualted in the receptacle; removing resultant granulated slag particles from said receptacle while the granulation of the molten steel slag is in progress; collecting steam generated due to contact of molten slag with water in said granulator without substantial emission of steam into the atmosphere around said receptacle; transporting of said collected steam to a location away from said granulator; and disposing of said steam away from said granulator at said location.

2. A method of handling molten steel slag as defined in claim 1 wherein steam generated during slag granulation is collected at a minimum rate of about 44 c.f.m. of steam per ton of slag granulated per minute.

3. A method of handling molten steel slag as defined in claim 1 wherein said water for granulation of said molten steel slag is provided at a rate of about 900–1350 gallons per minute per ton of slag granulated per minute and wherein said generated steam is collected at the rate of at least 32.4 c.f.m. per ton of slag granulated per minute.

4. A method for handling molten steel slag as defined in claim 1 wherein said water for granulation of said molten steel slag is provided with a jet velocity of at least 25.0 per second in a quantity of between about 1200–2000 gallons per minute for a molten slag input rate of up to about 2 tons per minute, with a jet velocity of at least about 30–36.5 feet per second, and in a quantity of between 2000–4000 gallons per minute for a molten slag input rate of about 2–4 tons per minute, with a jet velocity of at least 36.5–55 feet per second and in a quantity of between 3000–5000 gallons per minute for a slag input rate of 4–7 tons per minute; and wherein the generated steam is collected at a minimum rate depending upon the quantity of water injected into the granulator in relation to the rate of slag input to said granulator in accordance with the following table.

| Slag input, tons/min. | Total water input, gal./min. | Range of minimum steam removal rates, c.f.m. | |
|---|---|---|---|
| | | Low value | High value |
| Up to 2 | 1,200–2,000 | 51.9–24.2 | 76.0–59.9 |
| 2–4 | 2,000–4,000 | 24.2–48.4 | 59.9–120.0 |
| 4–7 | 3,000–5,000 | 82.8–154.0 | 143.0–258.0 |

5. A method of handling molten steel slag as defined in claim 1 wherein said step of disposing of said steam comprises venting said steam to the atmosphere at a location remote from said granulator receptacle.

6. A method of handling molten steel slag as defined in claim 1 wherein said steam generated during slag granulation is transported away from said granulator and disposed of at substantially the same rate as it is collected.

7. An apparatus for handling molten slag comprising: a slag granulator including a receptacle, means for pouring molten slag into the receptacle, nozzle means for injecting at least one jet stream of water into the receptacle to intercept the molten slag and to granulate said slag into particles, means for maintaining water accumulating in the receptacle at a level below said jet stream while molten slag is being poured into the receptacle whereby said molten slag intercepts the jet stream above the level of the water accumulated in the receptacle, means for removing resultant granulated slag particles from the receptacle while slag granulation is in progress, and steam removal means including means for collecting steam produced by contact of the molten slag with said jet stream and with water accumulated in said receptacle without substantial emission thereof into the atmosphere around the granulator, and means for transporting the collected steam away from said granulator, and means for disposing of said steam at an appropriate discharge location.

8. Slag handling apparatus as defined in claim 7, wherein said steam collecting means comprises conduit means communicating with the interior of the granulator receptacle above the surface of the water accumulated therein, and wherein said steam transporting means comprises further conduit means connected to said collection conduit means for receiving said collected steam and for transporting said steam to said discharge location.

9. Slag handling apparatus as defined in claim 8 wherein said steam collecting means further comprises means for establishing a pressure differential between the interior of the collection conduit means and the interior of the granulator receptacle sufficient to exhaust the steam from said receptacle to said collection conduit means.

10. Slag handling apparatus as defined in claim 9 wherein said means for establishing a pressure differential comprises aspirator means operatively connected to said collection conduit means.

11. Slag handling apparatus as defined in claim 8 wherein said means for disposing of said steam comprises means for venting steam in said further conduit means to the atmosphere.

12. Apparatus for handling molten slag, comprising at least two granulators as defined in claim 7, wherein the collecting means comprises means forming a partially closed chamber above the water accumulated in each of said granulators, duct means connected with each of said partially closed chambers, breeching means connected in common to each of said duct means, and wherein said transporting means comprises exhaust conduit means connected to said breeching, and further including aspirator means for creating a pressure differential in said duct means and said breeching whereby steam generated during the granulation of molten slag is withdrawn from said partially closed chamber through said duct means and said breeching into the exhaust conduit means.

13. Molten slag handling apparatus as defined in claim 12 where the inner surface of the breeching and the exhaust conduit means comprises a layer of alkaline resisting material.

14. Apparatus for handling molten slag as defined in claim 7, wherein the collecting means comprises hood means forming a partially closed chamber above the water accumulated in said granulator, duct means connected with part of said hood means, exhaust conduit means connected to said duct means, and aspirator means for creating a pressure differential in said duct means and within said granulator hood means so that steam generated during the granulation of molten slag is withdrawn from said hood means through said duct means and exhaust conduit means, said partially closed hood means defining at least one opening through which excessively generated steam may escape if necessary.

15. Molten slag handling apparatus as defined in claim 14 where the aspirator means comprises blower means for producing a stream of air, and means connected to said blower means to inject said stream of air into the steam removal means.

16. Molten slag handling apparatus as defined in claim 15 wherein said injection means comprises an elongated tubular member with the discharge end thereof positioned in said exhaust conduit means.

17. Molten slag handling apparatus as defined in claim 14 wherein said hood means terminates adjacent to but spaced from two opposite ends of said receptacle to permit free inflow of air to and emergency egress of steam from the partially closed granulator chamber and to facilitate unimpeded pouring of molten slag into said granulator receptacle.

18. An apparatus for handling molten steel slag comprising: a slag granulator including a receptacle, means for pouring molten steel slag into the receptacle, means for injecting at least one jet stream of water into said receptacle to intercept the molten steel slag and to granulate said slag into particles, the water stream being injected with a jet velocity of at least 25.0 feet per second in a quantity of between about 1200–2000 gallons per minute for a molten slag input rate of up to about 2 tons per minute, the water stream being injected with a jet velocity of at least about 30–36.5 feet per second, and in a quantity of between 2000–4000 gallons per minute for a molten slag input rate of about 2–4 tons per minute, the water stream being injected with a jet velocity of at least about 36.5–55 feet per second and in a quantity of between 3000–5000 gallons per minute for a slag input rate of 4–7 tons per minute, means for maintaining water accumulating in said receptacle at a level below said jet stream while molten slag is being poured into the receptacle, whereby the molten steel slag intercepts said jet stream above the level of water accumulated in the receptacle, means for removing resultant granulated slag particles from said receptacle while the granulation of the molten steel slag is in progress, and steam removal means including means for collecting steam generated due to contact of molten slag with water in said granulator without substantial emission of steam into the atmosphere around the granulator and means for disposing of said steam at an appropriate discharge location.

References Cited

UNITED STATES PATENTS

| | | | |
|---|---|---|---|
| 980,606 | 1/1911 | Colloseus | 65—19 |
| 2,450,978 | 10/1948 | Meinzer | 65—20 |
| 2,702,407 | 2/1955 | Osborne | 65—20 |
| 3,316,075 | 4/1967 | Grady | 65—19 |

S. LEON BASHORE, Primary Examiner

E. R. FREEDMAN, Assistant Examiner

U.S. Cl. X.R.

65—141, 157, 159, 161, 162, 163

PO-1050
(5/69)

UNITED STATES PATENT OFFICE
CERTIFICATE OF CORRECTION

Patent No. 3,531,270  Dated September 29, 1970

Inventor(s) JOHN J. GRADY

It is certified that error appears in the above-identified patent and that said Letters Patent are hereby corrected as shown below:

Column 4, line 20 "hearts" should read -- hearth --; lines 24 and 41, "drawing" should read -- drawings --. Column 7, line 5, "patent" should read -- parent --. Column 9, line 7, after "(not shown)", cancel -- and --; line 37, "colsely" should read -- closely --. Column 10, line 38, "or" should read -- For --. Column 11, line 44, "miunte" should read -- minute --. Column 13, line 39, "paragraph" should read -- paragraphs --. Column 14, line 6, "mnimum" should read -- minimum --. Column 15, line 18, cancel "of".

SIGNED AND
SEALED
MAR 16 1971

(SEAL)
Attest:

Edward M. Fletcher, Jr.
Attesting Officer

WILLIAM E. SCHUYLER, JR.
Commissioner of Patents